UNITED STATES PATENT OFFICE.

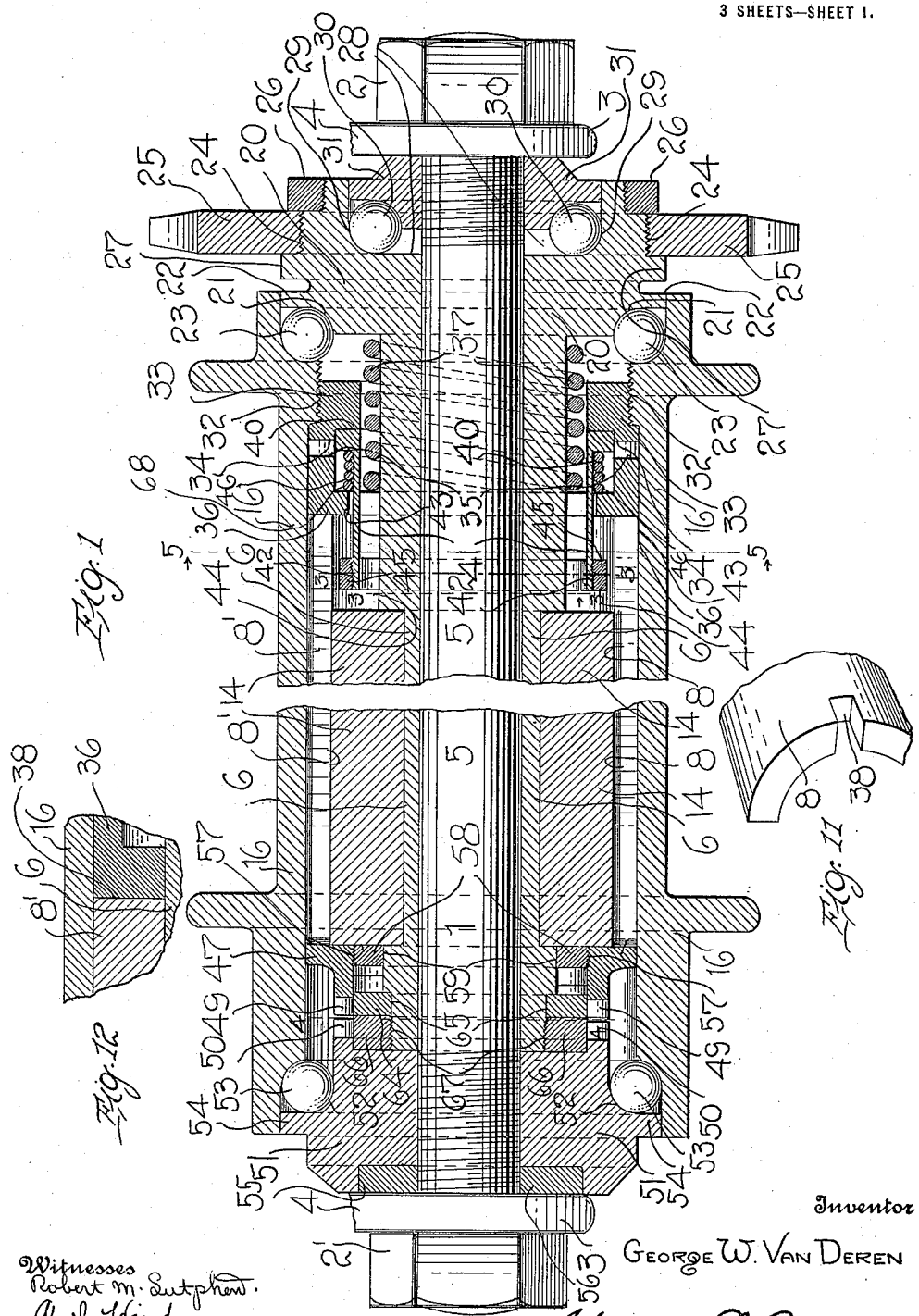

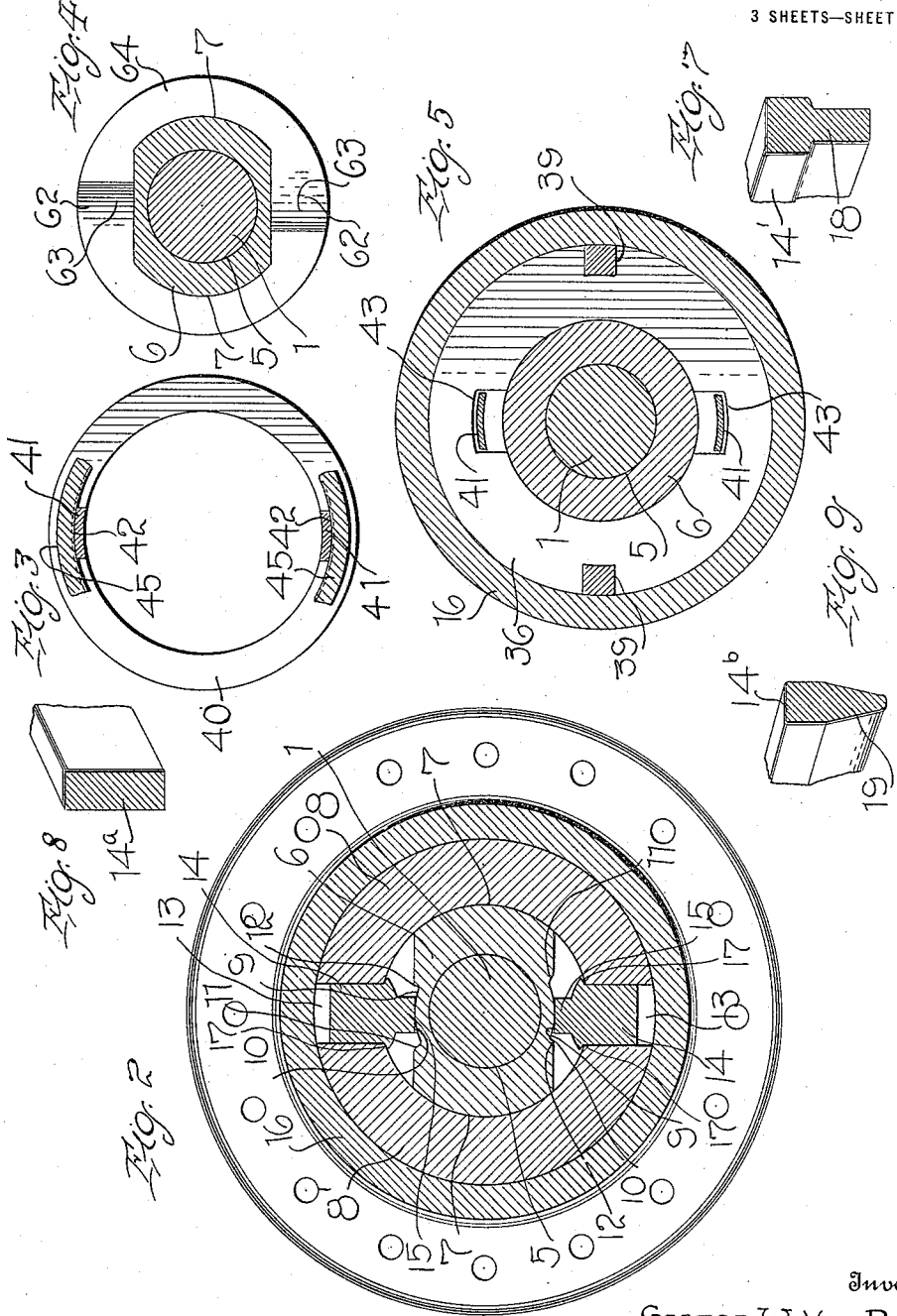

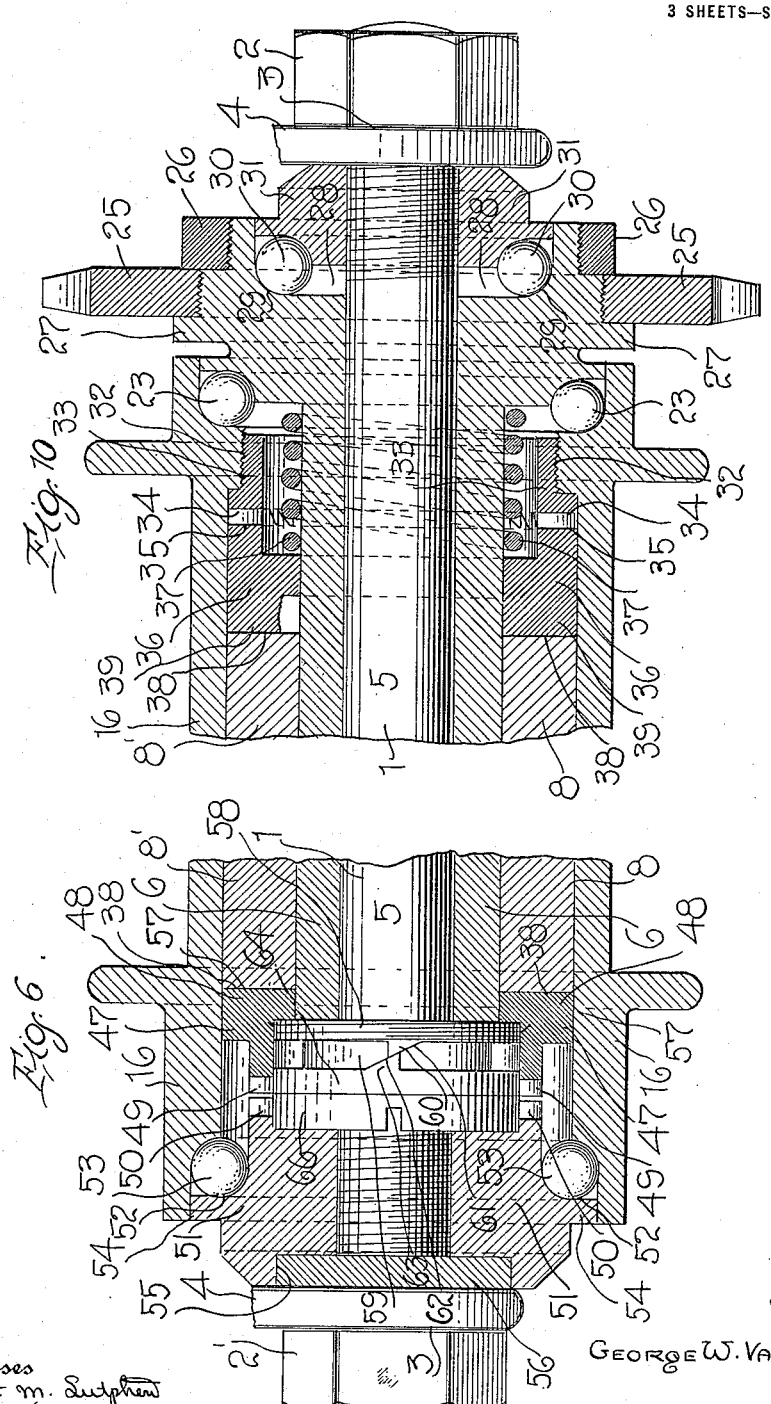

GEORGE W. VAN DEREN, OF ELMIRA, NEW YORK.

COASTER-BRAKE.

1,158,751.

Specification of Letters Patent.

Patented Nov. 2, 1915.

Application filed January 3, 1914. Serial No. 810,222.

*To all whom it may concern:*

Be it known that I, GEORGE W. VAN DEREN, a citizen of the United States, residing at Elmira, in the county of Chemung and State of New York, have invented certain new and useful Improvements in Coaster-Brakes, of which the following is a specification, reference being had to the accompanying drawings.

This invention relates to new and useful improvements in coaster brakes for vehicles and the like, the main object of the invention being to provide an improved structure of this character in which a maximum braking surface is provided without changing the well known shape of the ordinary hub.

Another object of the invention is the provision of a coaster brake which is largely used upon the hub of the rear wheel of a bicycle or motor cycle and is especially designed to be controlled by the rider for the purpose of rotating the wheels of a bicycle and propelling the vehicle forward or to permit the wheel to revolve freely or to brake the wheel and retard or check the movement of the bicycle or motor cycle.

A further object of the invention is the provision of an improved brake which will utilize a large braking surface without injury to any of the parts whereby a quicker and better braking action will result.

A still further object of the invention is the provision of a device of this character wherein the expanding brake shoe is utilized to assist in the driving movement of the hub whereby the hub and the parts contained therein will rotate simultaneously.

A still further object of the invention is the provision of a coaster brake wherein the expanding brake shoe is held from engagement with the driving clutch until the rotary speed of the driving clutch and the brake shoe has reached a substantially uniform speed so that the clicking of the clutch members which generally results from this engagement will be almost entirely eliminated.

A still further object of the invention is the provision of a coaster brake wherein the driving clutch is yieldably thrown out of engagement and the braking clutch is engaged just as soon as the forward rotary movement of the driving medium is stopped so that upon slight backward movement of the driving medium, the expanding brake shoe will be thrown into engagement with the barrel of the hub to retard the movement of the vehicle.

A still further object of the invention is the provision of a coaster brake of the above character which will possess advantages in points of efficiency and durability, is inexpensive to manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a longitudinal sectional view of a coaster brake constructed in accordance with my invention; Fig. 2 is a transverse sectional view; Fig. 3 is a transverse sectional view taken on the line 3—3 of Fig. 1 the movable collar being eliminated; Fig. 4 is a transverse sectional view taken on the line 4—4 of Fig. 1; Fig. 5 is a transverse sectional view taken on the line 5—5 of Fig. 1; Fig. 6 is a longitudinal sectional view of the device taken at right angles to the showing in Fig. 1; Fig. 7 is a detail perspective view illustrating the modified form of the braking levers; Fig. 8 is a detail perspective view illustrating another modified form of the braking levers; Fig. 9 is a detail perspective view illustrating still another modified form of the braking levers; Fig. 10 is a longitudinal sectional view through the brake illustrating a slightly modified form; Fig. 11 is a detail perspective view of one end of one of the brake shoes; and Fig. 12 is a detail sectional view illustrating the relative positions of the brake shoe and one of the clutch rings.

Referring more particularly to the drawings, 1 indicates the stationary axle threaded at each end and adapted to be locked within the rear forks of the bicycle and retained in such position by means of the nuts 2 and 2' threaded upon the outer ends of the axle and adapted for engagement with the lower circular ends 3 of the forks 4 to retain the axle in its effective position. The axle 1 is provided with a central smooth portion, generally indicated by the numeral 5 and mounted thereon for rotary movement is the inner hub member 6. This inner hub member 6 is preferably substantially rectangular in form and of such dimensions that the width of two of the side portions thereof is greater than the other two side portions and the smaller of the two side portions are preferably arcuate in form, as indicated at 7, to coincide with the semi-circular interior of the brake shoe which comprises the two sections 8 and 8'. The wider side portions of the inner hub are provided at a central point with the longitudinal grooves 9, the medial portions of which are arcuate, as shown at 10, and one of the side walls of each of the recesses is inclined, as shown at 11, while the other side wall of each of the recesses is preferably perpendicular, as shown at 12. The two sections 8 and 8' of the brake shoe are arranged in spaced relation at their longitudinal edges, as shown at 13, and arranged between the longitudinal edges of the sections of the brake shoe are the braking levers 14, the inner edges of which are reduced, as shown at 15, and adapted to be disposed within the longitudinal grooves 9 so that upon rotary movement of the inner hub member 6, in either direction, the inner longitudinal edges 15 will be engaged with either of the side walls of the groove whereby the outer longitudinal edges of the braking levers will force the longitudinal edges of the sections of the brake shoe apart and frictionally engage the outer periphery of the brake shoe with the interior of the outer hub member 16 so as to retard the rotary movement of the same. Outward longitudinal movement of the braking levers 14 is prevented by the tapering ribs 17 which are formed upon opposite sides of the braking levers and are adapted to engage the interior of the brake shoe sections upon each side of the longitudinal edges thereof.

In Fig. 7, I have illustrated a slightly modified form of braking lever 14' wherein the inner longitudinal edge 18 thereof is substantially one-half the width of the outer longitudinal edge. It will be understood that this form of braking lever will be retained in position and held against outward sliding movement by the inner periphery of the outer hub member 16.

In Fig. 8, I have illustrated still another modified form of braking lever 14ª wherein the width of the same is equal from the outer longitudinal edge to the inner longitudinal edge. This form of braking lever is held in its effective position in a manner similar to the retaining means of the lever 14'.

In Fig. 9, I have illustrated still another modified form of braking lever 14ᵇ wherein the inner longitudinal edge thereof is tapered, as illustrated at 19, and this tapering portion is adapted to be disposed within the longitudinal grooves 9 and each side thereof engaged with the side walls of the grooves. This form of braking lever will also be retained in position in a manner similar to the modified forms above described.

One end of the inner hub member 6 is provided with a circular enlargement 20 having upon its inner face a concave annular recess 21 and further provided with an annular flange 22 arranged adjacent the recess which is adapted to be disposed just within one end of the hub barrel 16 so as to retain the ball bearings 23 which are disposed between the enlarged member 20 and the hub barrel 16. The enlarged portion 20 is further provided upon its periphery with a threaded portion 24 upon which is mounted the sprocket wheel 25. The sprocket wheel 25 is retained in position by means of the locking nut 26 and the annular flange 27 between which said sprocket is disposed and rigidly held against movement upon the threaded portion 24.

The circular enlarged portion 20 of the inner hub member 6 is provided within its outer end with an annular recess 28 having ball races 29 formed therein in which the ball bearings 30 are arranged, said ball bearings being retained in position by means of the cone member 31, said cone member being threaded upon the end of the axle 1 and adapted to retain the inner hub member 6 in position. It will be noted from the drawings that the cone member 31 is securely held upon the end of the axle by means of the nut 2.

The hub barrel 16 is provided with an interior threaded portion, as indicated at 32 and arranged within the hub barrel is a collar 33 having exterior screw threads adapted for engagement with the screw threads 32 upon the interior of the hub barrel. The collar 33 is provided with a clutch face, as indicated at 34, which is adapted for engagement with the clutch face 35 upon the movable collar 36. Mounted upon the inner hub member 6 and disposed between the enlarged portion 20 and the collar 36 is a coil spring 37 which is adapted to yieldably disengage the two clutch faces 34 and 35 when driving power has been released so as to readily permit the rotation of the inner hub member and parts connected therewith, within the hub barrel 16.

Each section of the brake shoe is provided at each end with a centrally arranged recess 38, the recesses at one end of the brake shoe being adapted to receive the oppositely disposed lugs 39 formed upon the inner face of the collar 36 so that the collar and the brake shoe will rotate simultaneously. Arranged around the inner hub member 6 and the coil spring 37 is a ring 40 which is provided at diametrically opposite points with the spaced parallel arms 41, said arms being threaded upon their outer faces, as indicated at 42, and adapted to project through the recesses 43 formed in the inner face of the collar 36 and extend into the annular recess 44 formed in the end of the brake shoe and threaded thereon is the stop nut 45 which limits the longitudinal sliding movement of said arms by engaging the inner face of the collar 36, as clearly illustrated in Fig. 1. It will be noticed that the face of the ring 40 opposite the arms 41 is provided with a smooth surface adapted to frictionally engage the inner face of the collar 33.

It will be understood that during the forward movement of the bicycle, motor cycle or other vehicle, the outer hub barrel 16 will be rotating with the rear wheel and upon the forward rotary movement of the sprocket wheel by the driving medium, the ring 40, through the medium of the coil spring 46, which is mounted upon the arms 41, will be thrown into frictional engagement with the inner face of the collar 33 and it will be seen that by having the arms 41 projecting through the recesses 43 in the collar 36, the collar 36 and the brake shoe will be rotated and will continue to be rotated until the same is rotated at substantially the same speed as the outer hub barrel until the clutch faces 34 and 35 are thrown into engagement. From this it will be seen that if the hub barrel is rotating at a certain speed, the engagement of the ring 40 with the collar 33 will tend to rotate the collar 36 and the brake shoe until the same has acquired substantially the same speed, as the hub barrel, and the clutch members 34 and 35 are entirely engaged for driving the hub.

It will be understood that while the inner parts of the hub member 16 are retained in a stationary position, the ring 40 will be arranged in spaced relation from the collar 33 a sufficient distance so that the two faces will not be thrown into engagement until the forward rotary movement of the inner hub member has begun. It is preferred to have a space of about one-thirty-second part of an inch between the two faces of the parts 40 and 33.

Mounted within the hub barrel 16 and arranged at the opposite end of the brake shoe from the collar 36 is a sleeve 47 having formed upon its inner face the diametrically disposed lugs 48 which are adapted to be arranged within the central recesses 38 formed within the sections of the brake shoe at the ends thereof. The sleeve 47 is provided with an outer clutch face 49 which is adapted for engagement with a similar clutch face 50 formed upon the inner end of the cone member 51. The cone member 51 is threaded upon the end of the axle 1 opposite the cone member 31 and is provided with an inner ball race 52 which retains the ball bearings 53 in place and is further provided with an annular flange 54 which is disposed just within the end of the hub barrel to prevent dirt and other particles from entering the same. The outer end of the cone member 51 is provided with a suitable recess 55 in which is arranged the inner end of the brake arm 56, said brake arm being retained securely in position by means of the circular portion 3 of the frame and the nut 2'.

The sleeve 47 is provided upon its interior with a plurality of screw threads adapted for engagement with the screw threads 57 formed upon the collar 58, said collar being mounted upon the reduced portion 59 of the inner hub member and is provided upon its outer face with diametrically disposed lugs 60 which are provided with the opposed cam faces 61 adapted for engagement with the opposed cam faces 62 formed on the diametrically disposed lugs 63 of the collar 64. The collar 64 is mounted upon the reduced portion 65 which is formed upon the end of the inner hub member 6 and is preferably smaller in diameter than the reduced portion 59.

The collar 64 which is mounted upon the reduced portion 65 of the inner hub member 6 is held securely in place so that the same will rotate with the inner hub member by means of the stop nut 66 which is threaded upon the reduced inner end 67 of the hub member 6 and it will be further noticed from the accompanying drawings that the collar 58 is rotatable upon the reduced portion 59 of the inner hub member 6, while the reduced portion 65 is of the same shape as the inner hub member and the collar 64 which is mounted upon this reduced portion is provided with a central opening to tightly fit this reduced portion so that said collar will rotate with the inner hub member. Furthermore, the collar 64 is retained in position upon the reduced portion 65 by means of the nut 66, the nut 66 rotating with the inner hub member 6. It will be understood that the inner hub member 6 is normally retained in a stationary position, thus the collar 64 and the nut 66 will remain stationary also but upon rotation of the hub member in either direction, the aforesaid collar and nut will rotate therewith.

In Fig. 10, I have illustrated a slightly modified form embodying one end of the hub wherein the means for retaining the brake shoe and collar 36 against movement is eliminated and in this form of the device the recesses 43 which are formed upon the inner periphery of the collar 36 are eliminated, thus making the collar much stronger than in the preferred form. In this form of the invention, the clutch faces 34 and 35 are quickly thrown into engagement by the forward movement of the sprocket 25. It will be noticed that upon the forward movement of the sprocket 25, the cam faces 62 and 61 will co-act to force the brake shoe and the collar 36 laterally so that the clutch faces 34 and 35 will be engaged placing the spring 37 under tension and it will be noted that the tension of the spring 37 will force the brake shoe in the opposite direction after the driving power has been released, thus disengaging the clutch faces 34 and 35 and permitting the parts upon the interior of the hub barrel to remain stationary during the rotation of the barrel and the wheel mounted thereon.

From the above description taken in connection with the accompanying drawings, it will be readily understood that the operation of my improved coaster brake will be substantially as follows: During the forward driving movement of the sprocket wheel 25, the clutch faces 34 and 35 are engaged so that the hub barrel 16 and the wheel connected therewith will be rotated simultaneously with the parts contained within the hub barrel. Furthermore, it will be noticed that by construction of the inner hub member with respect to the brake shoe, the forward rotary movement of the sprocket wheel will impart the same movement to the inner hub member and expand the sections of the brake shoe so that they will frictionally engage the interior of the hub barrel and serve to assist the clutch members 34 and 35 in the driving of the wheel. It will also be noticed that during the forward driving movement of the sprocket 25, the clutch faces 49 and 50 are entirely disengaged and friction between the barrel and cone member is eliminated by the use of the ball bearings 53. The cone member 31 is also provided with the ball bearings 30 to eliminate friction between the same and the inner hub member. It will be understood that upon the forward driving movement of the inner hub member, the cam faces 61 and 62 will engage so that the cam faces 62 will force the brake shoe and the sleeve 47 laterally upon the inner hub member, thus disengaging the clutch faces 49 and 50. It will be noted from the illustration shown in Fig. 10, that the collar 58 is slidably mounted upon the reduced portion 59 so that the above mentioned movement of the sleeve 47 may be readily obtained through the medium of this collar and the engagement of the cam faces 61 and 62. When it is desired to release the driving movement, the rotation of the sprocket 25 is stopped through manual operation by the driver and as soon as the forward driving movement is stopped, the tension of the spring 37 will force the brake shoe and the collar 36 laterally upon the inner hub member and engage the clutch faces 49 and 50. It will be seen that upon backward rotary movement of the sprocket 25, the inner hub member 6 will be rotated so that the side walls of the groove 9 will engage with the inner longitudinal edges of the braking levers 14, forcing the edges of the brake shoe sections apart and frictionally engaging the outer peripheries of the brake shoe with the inner periphery of the hub barrel and thus retard the rotary movement of the hub barrel and the wheel carried thereby. It will be understood that as soon as the action against the braking levers 14 is stopped, the rotation of the hub barrel 16 will tend to force the sections of the brake shoe back to their normal position and upon forward rotary movement of the sprocket 25, the cam faces 61 and 62 will force the brake shoe and the collar 36 laterally so that the clutch faces 34 and 35 will be engaged to rotate the outer hub barrel 16. It will be noticed that by having the coil spring 46 mounted upon the arms 41 of the ring 40 and arranged within the recess 68 between the collar 36 and the ring 40, the lateral movement of the collar 36 will tend to place the spring under tension and force the ring 40 against the face of the collar 33 so that the ring 40 will be forced to rotate with the collar and from this it will be noted that the rotation of the ring will rotate the collar 36 and the brake shoe and will continue to rotate the same until they have reached a speed substantially the same as the rotary speed of the outer hub barrel and the clutch faces 34 and 35 are engaged, thus eliminating the clicking sound of the clutch members which generally occur with the usual form of brakes now in use.

From the above description taken in connection with the accompanying drawings, it will be readily apparent that I have provided a simple and durable coaster brake wherein the expanding brake shoe is not only utilized to retard the rotary movement of the hub barrel but is utilized to assist in the forward driving movement of the hub barrel so that more power may be obtained than with the form of coaster brakes now in use. It will also be apparent that I have provided an improved coaster brake which will utilize a large braking surface without injury to any of the parts whereby a quicker and better braking action will result. The device as herein shown and described is extremely simple in its construction and can be manufactured and placed upon any wheel upon the market at the present time at a very small cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A coaster brake including a hub formed with a barrel, and an axle extending therethrough, a sectional brake shoe within the barrel, an inner hub member mounted upon the axle and arranged within the brake shoe, and braking levers arranged between the sections of the brake shoe and co-acting with the inner hub member means whereby to rotate said hub member in either direction to expand the brake shoe against the inner periphery of the barrel.

2. A coaster brake including a hub formed with a barrel, a longitudinal axle extending therethrough, a sectional brake shoe within the barrel, a substantially rectangular inner hub member mounted upon the axle and arranged within the brake shoe, longitudinal grooves formed in opposite side walls of the inner hub member and braking levers arranged between the sections of the brake shoes and having their inner longitudinal edges disposed within said grooves, means whereby to rotate said hub member in either direction to expand the brake shoe against the inner periphery of the barrel.

3. A coaster brake including a hub formed with a barrel, a sectional brake shoe including semi-circular sections having central recesses at each end thereof, a collar within the barrel having opposed lugs on one face thereof adapted to be arranged within the recesses at one end of the brake shoe, a clutch face formed upon the opposite side of said collar, a second collar connected with the barrel and having a clutch face arranged in opposed relation with the first clutch face, a sleeve at the other end of the brake shoe, opposed lugs formed upon one face of the sleeve and adapted to be arranged within the recesses in the brake shoe adjacent the sleeve, a clutch member formed upon the other face of said sleeve, a non-rotative clutch member to be engaged by the clutch member on the sleeve to hold the sectional brake shoe against rotation, and means for disengaging the clutch member on the sleeve from the non-rotative clutch member and successively forcing the brake shoe longitudinally to engage the first clutch faces.

4. A coaster brake including a hub formed with a barrel, and an axle extending therethrough, an inner hub member rotatably mounted upon said axle, a sectional brake shoe within the barrel and having central recesses formed in the ends of each of the sections, means for expanding the brake shoe against the inner periphery of the barrel, a sleeve within the barrel, opposed lugs upon one end of the sleeve adapted to be arranged within the recesses at one end of the brake shoe, a clutch face formed on the outer end thereof a cone member carried by one end of the axle and having a clutch face adapted to engage the clutch face of the sleeve, means for forcing said clutch faces into engagement with each other, camed faced lugs carried by said sleeve and a second set of cam faced lugs carried by the inner hub member and adapted to engage the first lugs to move the sleeve laterally within the barrel to disengage the clutch members, as and for the purpose set forth.

5. A coaster brake including a hub formed with a barrel, a sectional brake shoe adapted to engage the inner periphery of the barrel, having central recesses formed in each end of the sections of the shoe, means for expanding the brake shoe against the inner periphery of the barrel, a collar within the barrel, lugs formed integral with the collar and arranged within the recesses at one end of the brake shoe, a clutch face formed upon said collar and a clutch member carried by the barrel and adapted to engage said clutch face, means for moving the first clutch face laterally to engage the same with the second clutch face, as and for the purpose set forth.

6. A coaster brake including a hub formed with a barrel, and an axle extending therethrough, a sectional brake shoe arranged within the barrel, a substantially rectangular inner hub member mounted upon the axle and arranged within the barrel, a sprocket wheel carried by one end of the hub member to rotate the same, longitudinal grooves formed in opposed faces of the inner hub member, an inclined side wall formed within each of said grooves, and a perpendicular side wall formed in each of said grooves, braking levers having one of their longitudinal edges arranged between the sections of the brake shoe and their inner longitudinal edges disposed within said grooves and adapted to engage the side walls thereof upon rotary movement of the brake shoe in either direction to expand the sections of the brake shoe against the inner periphery of the barrel and means for retaining said shoes against rotation with respect to the barrel.

7. A coaster brake including a hub formed with a barrel, an axle extending therethrough, an inner hub member mounted upon the axle, a sectional brake shoe arranged within the barrel and mounted upon the hub member, a movable sleeve within the barrel at one end of the brake shoe and having means co-acting with the brake shoe whereby the same will rotate simultaneously, a clutch member formed on said sleeve, a cone carried by the axle, and having a clutch member adapted to engage with the clutch member on the sleeve, means for moving said sleeve laterally to engage said clutch faces with each other and actuate the sections of the brake shoe, a collar threaded within the sleeve and having opposed cam faced lugs, a ring carried by the inner hub member and having opposed cam faced lugs whereby upon forward rotary movement of the inner hub member, the cam faced lugs will co-act to disengage the clutch members, as and for the purpose set forth.

8. A coaster brake including a hub formed with a barrel, an axle extending therethrough, an inner hub member mounted upon the axle, a sectional brake shoe mounted upon the inner hub member, means for expanding said brake shoe against the inner periphery of the barrel, a collar at one end of the brake shoe and mounted upon the inner hub member, a clutch face formed on said collar, whereby to impart lateral movement to a clutch face carried by the barrel and adapted to normally engage the first clutch face, an enlarged portion formed upon one end of the hub member, means for rotating the inner hub member whereby to engage said clutch faces, a coil spring mounted upon the hub member and disposed between said collar and the enlarged portion to move the brake shoe and collar laterally upon the inner hub member in one direction to disengage said clutch faces.

9. A coaster brake including a hub formed with a barrel, and an axle extending therethrough, an inner hub member mounted upon the axle, a sectional brake shoe mounted upon the inner hub member, a collar at one end of the brake shoe and mounted upon the inner hub member, an enlarged portion formed upon one end of the hub member, a coil spring mounted upon the inner hub member and disposed between said collar and the enlarged portion to move the brake shoe and collar rearwardly upon the inner hub member in one direction, and means whereby to move the brake shoe laterally upon the inner hub member against the tension of said spring, as and for the purpose set forth.

10. A coaster brake including a hub formed with a barrel, a sectional brake shoe within the barrel, having an annular recess within one end, and further provided with opposed recesses, a collar arranged within the bore of the barrel having lugs arranged within said recesses, and provided with a clutch face, a second collar arranged within the bore of the barrel, a clutch face and an annular smooth face upon said collar, a ring within the barrel and adapted to frictionally engage the smooth face and means arranged between said first collar and the ring for yieldably forcing said ring into engagement with the smooth face of the collar, as and for the purpose set forth.

11. A coaster brake including a hub formed with a barrel, a sectional brake shoe within the barrel having an annular recess at one end and further provided with opposed recesses in the ends thereof, a collar within the barrel, opposed lugs formed on the collar adapted to be arranged within said recesses, a clutch face formed upon the opposite side of said collar, said collar being provided with opposed recesses, a second collar carried by the barrel, a clutch face formed thereon and arranged in opposed relation with the first clutch face, means for actuating the first collar to engage the clutch face thereon with the clutch face on the second collar, said second collar having a smooth portion formed adjacent the clutch face, a flat ring within the barrel having arms projecting through said recesses in the first collar and into the annular recess in the brake shoe, a stop nut threaded upon the inner ends of said arms, and a coil spring arranged between the ring and the first collar, as and for the purpose set forth.

12. A coaster brake including a hub formed with a barrel, a brake shoe arranged within the barrel, said shoe having an annular recess in one terminal and diametrically opposed lug receiving recesses located adjacent to the first mentioned recess, a collar arranged within the barrel, diametrically opposed lugs extending from one face of the collar, said lugs being adapted to seat in the diametrically opposed recesses of the shoe, said collar being also provided with diametrically opposed recesses, clutch teeth formed on that face of the collar which is remote from the shoe, a second collar arranged within the barrel and provided on one face with clutch teeth adapted to engage with the clutch teeth of the first collar, means operable for engaging the clutch members, a ring arranged within the barrel and provided with arms projecting through the recesses in the first mentioned collar and into the annular recess of the brake shoe, a stop nut threaded on the inner end of said arms, and a helical spring wound about said arms and interposed between the first mentioned collar and the ring for normally holding the clutch members in inoperative relation.

13. A coaster brake including a hub formed with a barrel, a sectional brake shoe therein having an annular recess at one end and further provided with opposed recesses in the end of the brake shoe, means for expanding the shoe against the inner periphery of the barrel, a collar within the barrel having lugs adapted to engage within said opposed recesses, a clutch member formed upon the opposite face of said collar, a collar carried by the barrel and having a clutch member, means for engaging said clutch member to rotate the barrel, and an annular smooth portion formed upon one face thereof, said first mentioned collar being provided upon its inner periphery with opposed recesses, a flat ring within the barrel, oppositely disposed arms formed integral with the ring and extending through said recesses in the collar into the annular recess of the brake shoe, a stop nut threaded upon the inner ends of said arms and a coil spring mounted upon the arms and disposed between the ring and the first collar to yieldably engage the ring with the annular smooth portion of the second collar, as and for the purpose set forth.

14. A coaster brake including a hub formed with a barrel, an axle extending therethrough, a substantially rectangular inner hub member mounted upon the axle and having longitudinal grooves formed in opposed faces thereof, a sectional brake shoe mounted upon the inner hub member within the barrel, braking levers having their outer longitudinal edges disposed between the sections of the brake shoe and their inner longitudinal edges disposed within said grooves, whereby upon rotary movement of the inner hub member, the inner longitudinal edges of the braking levers will be engaged by the walls of the grooves to oscillate the same and expand the sections of the brake shoe against the inner periphery of the barrel, and longitudinal ribs formed upon opposite sides of the braking levers to prevent lateral movement of the same.

In testimony whereof I hereunto affix my signature in the presence of two witnesses.

GEORGE W. VAN DEREN.

Witnesses:
R. H. V. DANN,
FRANK J. GORMAN.

Copies of this patent may be obtained for five cents each, by addressing the "Commissioner of Patents, Washington, D. C."